US012634309B1

(12) United States Patent
Ravia et al.

(10) Patent No.: US 12,634,309 B1
(45) Date of Patent: May 19, 2026

(54) NETWORK SECURITY FOR MACHINE LEARNING MODELS INCLUDING LARGE LANGUAGE MODELS (LLMS)

(71) Applicant: CATO NETWORKS LTD., Tel-Aviv (IL)

(72) Inventors: Itay Ravia, Givatayim (IL); Adir Gruss, Tel Aviv (IL); Ofir Abu, Tel Aviv (IL); Omer Doron, Ramat Gan (IL); Tomer Bin, Tel Aviv (IL)

(73) Assignee: CATO NETWORKS LTD, Tel-Aviv (IL)

( * ) Notice: Subject to any disclaimer, the term of this patent is extended or adjusted under 35 U.S.C. 154(b) by 0 days.

(21) Appl. No.: 19/281,668

(22) Filed: Jul. 27, 2025

(51) Int. Cl.
*H04L 9/40* (2022.01)
*G06F 40/284* (2020.01)

(52) U.S. Cl.
CPC ........ *H04L 63/1416* (2013.01); *G06F 40/284* (2020.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 12,107,885 B1 * | 10/2024 | Kawasaki | ................. | G06N 3/08 |
| 12,111,747 B1 * | 10/2024 | Jain | ............................ | G06F 8/41 |
| 12,135,740 B1 * | 11/2024 | Yu | ......................... | G06F 16/3329 |
| 12,147,513 B1 * | 11/2024 | Jain | ...................... | G06F 21/6218 |
| 12,236,193 B1 * | 2/2025 | Kuperman | ............ | G06F 40/284 |
| 2022/0269796 A1 * | 8/2022 | Chase | ................. | H04L 63/0861 |
| 2024/0290331 A1 * | 8/2024 | Lu | ........................... | G10L 15/063 |
| 2024/0411896 A1 * | 12/2024 | Myers | .................... | G06F 21/552 |
| 2025/0110711 A1 * | 4/2025 | Palanki | ...................... | G06F 8/60 |
| 2025/0137675 A1 * | 5/2025 | Lessans | ................... | F24F 11/38 |
| 2025/0335831 A1 * | 10/2025 | Blowers | ................. | G06N 20/20 |
| 2025/0362990 A1 * | 11/2025 | Chaturvedi | ........... | G06F 11/079 |

OTHER PUBLICATIONS

Zuo et al.; Knowledge Transfer from LLMs to Provenance Analysis: A Semantic-Augmented Method for APT detection; 2025; retrieved from the internet: https://arxiv.org/abs/2503.18316; pp. 1-11, as printed (Year: 2025).*

Hung et al.; "Attention Tracker: Detecting Prompt Injection Attacks in LLMs"; 2025; retrieved from the Internet: https://arxiv.org/abs/2411.00348; pp. 1-14, as printed. (Year: 2025).*

* cited by examiner

*Primary Examiner* — Michael W Chao
(74) *Attorney, Agent, or Firm* — FINNEGAN, HENDERSON, FARABOW, GARRETT & DUNNER LLP

(57) ABSTRACT

There is provided a system for securing an AI-application guided by a LLM, comprising: a processor executing a code for: receiving a session of an interaction by an entity with the LLM-guided AI-application, the session including a plurality of output tokens generated by the AI-application in response to a plurality of input tokens inputted into the AI-application by the entity and/or from at least one external resource, dynamically during processing of the session by the LLM, tracing control and/or data-flow within attention-heads of transformer layers of the LLM with respect to the session, to identify at least one output token of the plurality of output tokens logically stemming from at least one input token of the plurality of input tokens originating from the at least one external resource, and triggering a security action for preventing the at least one external resource from feeding adversarial input into the AI-application.

24 Claims, 6 Drawing Sheets

100

Receive session 202

Identify dataflow heads 204

Trace control and/or data-flows 206

Compute token-graph 208

Identify output token(s) stemming from input token(s) 210

Trigger security action 212

Generate annotated dataset of sample sessions 250

Execute sample sessions on the AI-application 252

Generate heatmap 254

Select a sub-set of attention heads 256

Provide the sub-set as the dataflow heads 258

Start loading process 270

Trigger monitoring process 272

Call inference on the loaded model 274

Generate logs 276

Generate clean logs 278

Filter monitored logs with respect to the clean logs 280

Analyze subset of logs 282

Trigger security action(s) 286

1

NETWORK SECURITY FOR MACHINE LEARNING MODELS INCLUDING LARGE LANGUAGE MODELS (LLMS)

BACKGROUND

The present invention, in some embodiments thereof, relates to network security and, more specifically, but not exclusively, to network security of a machine learning model.

Network security for machine learning models protects data and models from unauthorized access and/or attacks during training and deployment (i.e., inference). Network security may include encryption, access control, and/or secure APIs to guard data in transit. Additional measures defend against adversarial inputs, model theft, and poisoning in distributed systems. Firewalls, intrusion detection, and privacy-preserving techniques further enhance security.

SUMMARY

According to a first aspect, a system for securing an AI-application guided by a large language model (LLM), comprises: at least one processor executing a code for: receiving a session of an interaction by an entity with the LLM-guided AI-application, the session including a plurality of output tokens generated by the AI-application in response to a plurality of input tokens inputted into the AI-application by the entity and/or from at least one external resource, dynamically during processing of the session by the LLM, tracing control and/or data-flow within attention-heads of transformer layers of the LLM with respect to the session, to identify at least one output token of the plurality of output tokens logically stemming from at least one input token of the plurality of input tokens originating from the at least one external resource, and triggering a security action for preventing the at least one external resource from feeding adversarial input into the AI-application.

According to a second aspect, a method for securing an AI-application guided by a large language model (LLM), comprises: using at least one processor for: receiving a session of an interaction by an entity with the LLM-guided AI-application, the session including a plurality of output tokens generated by the AI-application in response to a plurality of input tokens inputted into the AI-application by the entity and/or from at least one external resource, dynamically during processing of the session by the LLM, tracing control and/or data-flow within attention-heads of transformer layers of the LLM with respect to the session, to identify at least one output token of the plurality of output tokens logically stemming from at least one input token of the plurality of input tokens originating from the at least one external resource, and triggering a security action for preventing the at least one external resource from feeding adversarial input into the AI-application.

According to a third aspect, a non-transitory medium storing program instructions for securing an AI-application guided by a large language model (LLM), comprising program instructions which when executed by at least one processor, cause the at least one processor to: receive a session of an interaction by an entity with the LLM-guided AI-application, the session including a plurality of output tokens generated by the AI-application in response to a plurality of input tokens inputted into the AI-application by the entity and/or from at least one external resource, dynamically during processing of the session by the LLM, trace control and/or data-flow within attention-heads of transformer layers of the LLM with respect to the session, to identify at least one output token of the plurality of output tokens logically stemming from at least one input token of the plurality of input tokens originating from the at least one external resource, and trigger a security action for preventing the at least one external resource from feeding adversarial input into the AI-application.

In a further implementation form of the first, second, and third aspects, the security action is selected from: blocking the external resource from interacting with the AI-application, generating a security alert indicating that the external resource is suspicious, logging a security event, generating a pop-up window with a user interface for presentation on a display for requesting user confirmation to proceed, triggering an automated security process for automatically analyzing the external resource to detect malicious intent, and terminating the session with the AI-application.

In a further implementation form of the first, second, and third aspects, the control and/or data-flow is traced within the attention-heads of a simulated LLM that is different than the LLM-guided AI-application, the simulated LLM is predicted to generate activation patterns within its attention-heads in response to being fed the simulated session, that are correlated to the activation patterns generated within the LLM guiding the AI-application.

In a further implementation form of the first, second, and third aspects, receiving the session comprises at least one of: (i) extracting the session from packets sent over a network by sniffing and/or intercepting, and (ii) monitoring a user interface of the entity for extracting the session, and further comprising feeding the extracted session into the simulated LLM, wherein the tracing is performed during processing of the session by the simulated LLM.

In a further implementation form of the first, second, and third aspects, the at least one external resource represents an untrusted resource and the security action is triggered in response to detecting that the untrusted resource triggered the at least one output token.

In a further implementation form of the first, second, and third aspects, further comprising code for: identifying dataflow heads from the attention-heads, wherein the dataflow heads exhibit correlation patterns between the plurality of input tokens and the plurality of output tokens that indicate causal relationships, wherein the control and/or data-flow is traced within the dataflow heads.

In a further implementation form of the first, second, and third aspects, identifying the dataflow heads from the attention-heads comprises: generating an annotated dataset of a plurality of sample sessions of at least one sample entity interacting with the AI-application, comprising labels for each segment of each sample session selected from: an internal resource, an external resource and manipulation attempt, and an output of the manipulation attempt, executing the plurality of sample sessions on the AI-application, during the execution, computing a score for each attention-head of the LLM based on an amount of a correlation between an activation pattern in the attention head and corresponding causal relationships defined by the annotated dataset, selecting a subset of attention-heads with scores above a threshold, and defining the dataflow heads as the subset of attention-heads.

In a further implementation form of the first, second, and third aspects, each sample session of the plurality of sample sessions comprises and/or is defined for at least one of: (i) the AI-application has access to internal resources, (ii) during the sample session, while the AI-application processes an external resource, the AI-application is manipulated into processing at least one of the internal resources, (iii) during the sample session, while the AI-application processes an external resource, the AI-application is manipulated into generating a misaligned output.

In a further implementation form of the first, second, and third aspects, the plurality of sample sessions include at least one of: (i) the at least one output token is embedded, (ii) the at least one output token does not appear in a plain-text format, (iii) the manipulation attempt includes a plurality of chained tool calls that include the manipulation instructions as a combination.

In a further implementation form of the first, second, and third aspects, further comprising code for: generating a heatmap of the attention-heads, the heatmap comprising a matrix of elements, wherein each element is defined by a certain row and a certain column, wherein each row of the matrix denotes a layer representing a single transformer of the LLM, and each column of the matrix denotes a specific attention head, wherein a pixel intensity and/or color of each respective element is according to the score computed for the attention-head corresponding to the respective element.

In a further implementation form of the first, second, and third aspects, further comprising code for: computing a token-graph comprising a plurality of nodes connected by a plurality of edges, wherein the token-graph is computed based on the control and/or data-flow within the dataflow heads traced during the session, wherein each node denotes an input token or an output token of the session, wherein an edge from a first node to a second node is defined if and only if an attention pattern of the dataflow heads denoting a control and/or data-flow indicates that a first token denoted by the first node is related to a second token denoted by the second node.

In a further implementation form of the first, second, and third aspects, further comprising code for: identifying the at least one output token logically stemming from the at least one input token originating from the external resource, by tracing a path within the token graph, from a third node corresponding to the at least one output token to a fourth node corresponding to the at least one input token originating from the external resource.

In a further implementation form of the first, second, and third aspects, the tracing control and/or data-flow is performed to identify that the at least one output token is mapped to at least one first input token originating from the external resource and to at least one second input token originating from an internal resource.

In a further implementation form of the first, second, and third aspects, the session comprises a graphical user interface (GUI) presented on a display of a client terminal, configured for a user to enter input into the AI-application, the input including human-readable text, and for presenting output generated by the AI-application guided by the LLM, the output including human-readable text.

In a further implementation form of the first, second, and third aspects, the AI-application and/or the LLM is selected from a plurality of open-source models with at least one of: different purposes, different architectures, for different domains, trained using different datasets.

In a further implementation form of the first, second, and third aspects, further comprising code for: prior to loading of at least one file of the LLM, starting a loading process configured to load the at least one file of the LLM, triggering a monitoring process that generates monitored logs by monitoring system calls and library calls made by the loading process, selecting monitoring logs recorded by the monitoring process during monitoring between starting of loading by the loading process and completion of the loading by the loading process, after the LLM is loaded, calling inference on the loaded model using a preselected input, filtering the monitored logs of the LLM with respect to clean logs generated by monitoring a clean version of the LLM, to identify a subset of logs that do not exist in the clean logs, and triggering the security action in response to detecting the subset of logs.

In a further implementation form of the first, second, and third aspects, further comprising code for: detecting in the subset of logs that do not exist in the clean logs, a certain system call and/or certain library call triggered by the at least one external resource embedded in the LLM, wherein the security action is triggered in response to detecting the certain system call and/or certain library call triggered by the at least one external resource embedded in the LLM.

In a further implementation form of the first, second, and third aspects, further comprising code for: performing a pre-processing procedure for generating the clean logs, comprising: identifying a clean LLM comprising a clean instance of the LLM excluding inference-related adversarial payloads, prior to loading of at least one file of the clean LLM, starting the loading process configured to load the at least one file of the clean instance of the LLM, triggering the monitoring process that monitors system calls and library calls made by the loading process, after the clean LLM is loaded, calling inference on the loaded clean LLM, and generating the clean logs by the monitoring process during the inference session.

In a further implementation form of the first, second, and third aspects, the monitoring process is implemented as bpftrace implementing eBPF (extended Berkeley Packet Filter) tracing.

In a further implementation form of the first, second, and third aspects, the security action is selected from: quarantining the LLM, deleting the LLM, blocking the LLM, blocking certain system call and/or certain library call triggered by the at least one external resource embedded in the LLM.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
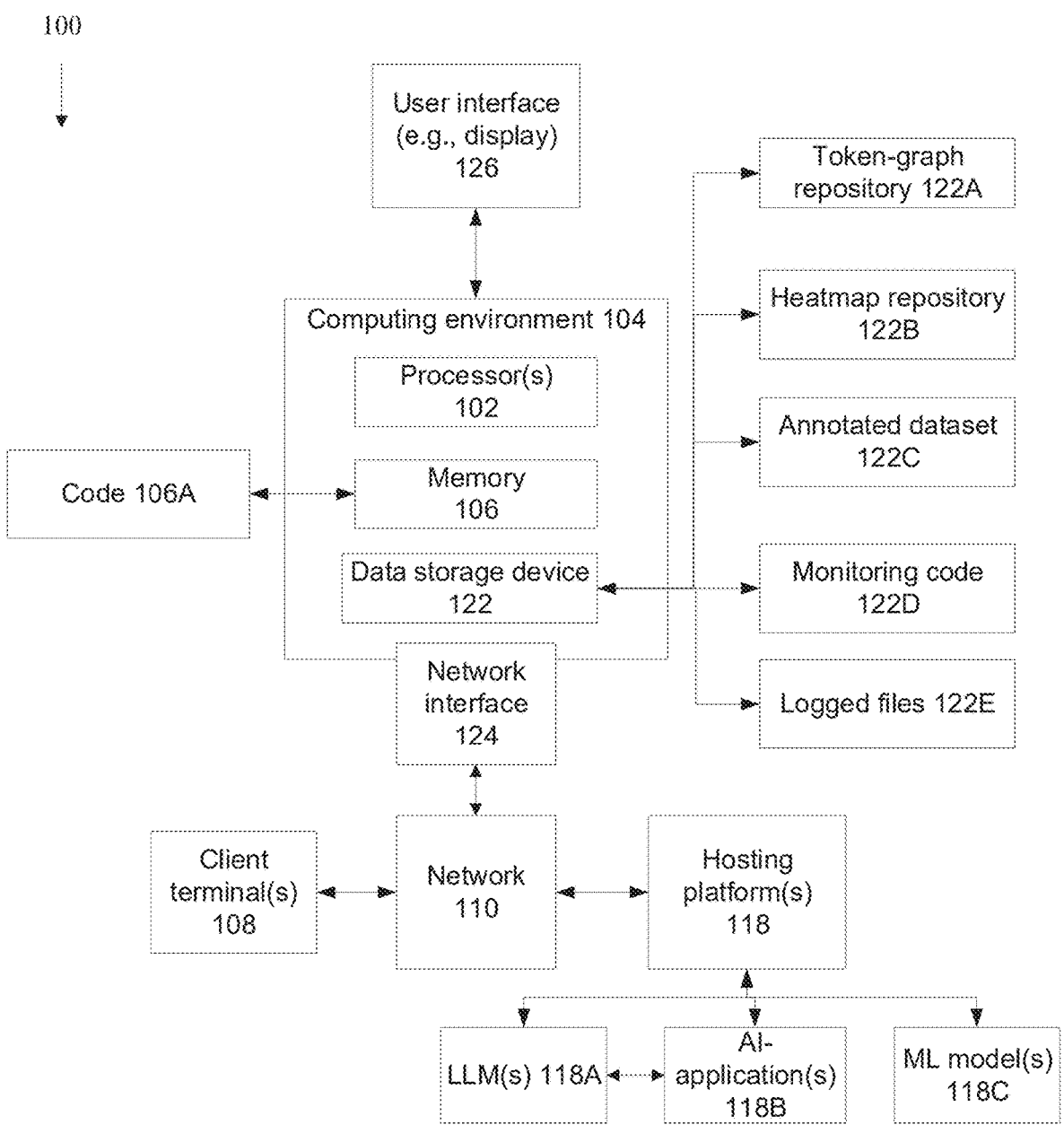
FIG. 1 is a block diagram of components of a system for providing network security to a LLM guiding an AI-application, in accordance with some embodiments of the present invention.

The present invention, in some embodiments thereof, relates to network security and, more specifically, but not exclusively, to network security of a machine learning model.

An aspect of some embodiments of the present invention relates to systems, methods, computing devices, and/or code instructions (e.g., stored on a data storage device and executable by one or more processors) for securing a model, for example, an AI-application guided by a LLM, and/or other implementations of machine learning models of various architectures (e.g., neural networks, support vector machines (SVM), k-nearest neighbor (k-NN), gradient boost trees, and the like. The security may be provided during various use-states and/or development-states of the model, including during loading and/or during a session with an entity (e.g., user). The security may be provided for the system of the AI-application and corresponding LLM model, which may be referred to as AI-agent. The security may be provided for a computing environment which is accessed by the model, optionally the agent AI-agent, by protecting the computing environment from adversarial attacks by the model, for example, from leaking out sensitive information in response to an adversarial input fed into the AI-agent, and/or from an attack triggered by malicious code embedded within the model which is activated upon loading of the model.

In implementations for protecting against adversarial actions performed by the AI-agent, the LLM may serve as the decision-making center (e.g., the "brain"), which may, for example: interpret user requests and/or other external inputs, decide what actions to take next, and/or generate responses and/or commands. The AI-application may serve as the interface with the external environment (e.g., the "body"), for example by: executing the LLM's decisions, providing tools and capabilities to the LLM, interfacing with external resources and/or entities, and/or feeding results back to the LLM. An exemplary control flow for a short session may be:

User input (1)→AI-application (2)→LLM (3)→AI-application (4)→LLM (5)→AI-application (6)→Provide output to external environment
Details Regarding the Aforementioned Short Session:

1. User input: "Check my emails and summarize urgent ones".

2. AI-application: Receives request, passes to LLM.

3. LLM: Decides to use email tool, generates command to AI-application

4. AI-application: Executes email retrieval.

5. LLM: Processes email content, decides what's urgent

6. AI-application: Presents summary on a display

As used herein the term internal, in particular internal resource, refers to data (e.g., emails, code, documents, database) that is located (e.g., virtually located) within defined network boundaries (e.g., secure borders) of a computing environment, for example, a server and/or computing device and/or authenticated connected end network devices. The internal resource may represent trusted resources.

As used herein the term external, in particular external resource, refers to data (e.g., emails, code, documents, database) that is located (e.g., virtually located) externally to the defined network boundaries (e.g., secure borders) of the computing environment, for example, externally to the server and/or computing device and/or authenticated connected end network devices. For example, an email, code, document, or other data, originating from external to the defined network boundaries.

The external resource(s) may represent untrusted resources. Data originating from external resources is associated with a relatively higher likelihood of triggering malicious actions than data originating from internal resources. Embodiments described herein are designed to detect such malicious external resources triggering actions by the LLM and/or AI-application.

Data provided by an entity during a session with an AI-application may be defined as originating from the external resource. For example, a malicious entity (e.g., human hacker, automatic bot) is attempting to perform malicious actions after having gained secure access to the computing environment.

Alternatively, the external resource may be embedded within the model. During loading of the model, the external resource may make system and/or library calls which are designed to perform malicious actions. Embodiments described herein are designed to detect such malicious external resources embedded within the model.

An aspect of some embodiments of the present invention relates to systems, methods, computing devices, and/or code instructions (e.g., stored on a data storage device and executable by one or more processors) for securing an AI-application (artificial intelligence-application) guided by LLM. A session of an interaction by an entity (e.g., human, automated bot) with the LLM-guided AI-application, is received (e.g., accessed). The session includes output tokens generated by the AI-application in response to input tokens inputted into the AI-application by the entity and/or from at least one external resource (e.g., an email with adversarial instructions to leak sensitive data). During processing of the session by the LLM, control and/or data-flows are dynamically traced within attention-heads of transformer layers of the LLM, optionally within dataflow heads selected from the attention-heads. The control and/or data-flows are traced with respect to the session, to identify one or more output tokens logically stemming from one or more of the input tokens originating from the external resource. A security action is triggered for preventing the external resource from feeding adversarial input into the AI-application. The security action may be triggered in response to detecting that the output token(s) logically stemming from the input token(s) originating from the external resource are directed towards malicious actions, such as outputting sensitive information. The input that is traced to the output token(s) directed towards the malicious action is the adversarial input that is prevented from being fed into the AI-application by the security action.

An aspect of some embodiments of the present invention relates to systems, methods, computing devices, and/or code instructions (e.g., stored on a data storage device and executable by one or more processors) for detecting an inference-related adversarial payload embedded within a model. Prior to loading of at least one file of the model, a loading process designed to load the file(s) of the model is started. A monitoring process that monitors system calls and library calls made by the loading process is triggered. The monitoring process may be implemented as, for example, bpftrace implementing eBPF (extended Berkeley Packet Filter) tracing, which may enable securely evaluating the model for adversarial payloads. After the model is loaded, inference is called on the loaded model. A preselected input (e.g., fake input not provided by a user and/or entity) may be fed into the loaded model for inference. The preselect input may be designed to encourage and/or trigger the malicious code embedded in the model to make system calls and/or library calls designed to perform adversarial actions. The monitored logs of the LLM may be filtered with respect to clean logs generated by monitoring a clean version of the LLM, to identify a subset of logs that do not exist in the clean logs. The subset of logs may include certain system calls and/or certain library calls triggered by the external resource embedded in the LLM. A security action may be triggered in response to detecting the subset of logs, optionally in response to detecting the certain system calls and/or certain library calls in the subset of logs. The security action may be, for example, quarantining the LLM, deleting the LLM, blocking the LLM, and/or blocking the certain system call and/or certain library call triggered by the external resource embedded in the LLM.

At least one embodiment is directed towards the technical problem of securing a model (e.g., LLM or other architecture) from attack. The attack which is to be secured against may be, for example, performed by an external resource manipulating the LLM into releasing internal resources and/or triggered by malicious code embedded within the model. The attack may be performed by the external resource manipulating the control and/or data-flow of the AI-application and/or LLM to release the internal resource. The attack may be performed by the external resource within the model that upon loading of the model, makes certain system calls and/or certain library calls designed to cause adversarial actions. The technical problem may relate to protecting an LLM from being manipulated, where external resources (e.g., information, data) which is integrated into the AI-application guided by the LLM affects the control and/or the data-flow of the AI-application and/or LLM, cause the AI-application and/or the LLM to generate misaligned outputs and/or trigger behaviors unintended by the user. The technical problem may relate to detecting attacks in which an adversarial attacker manipulates an AI-application controlled by a LLM. The technical problem may relate to protecting a computing environment from a model that executes malicious code during loading that performs system calls and/or library calls designed to perform malicious actions. At least one embodiment improves the technology of network security, by providing an improved approach for securing a LLM from attack. At least one embodiment improves upon prior approaches for securing a LLM from attack. At least one embodiment provides the practical approach of securing a LLM from attack, by triggering one or more security related actions in response to detecting an attack on the LLM.

At least one embodiment is directed towards the technical problem of securing a model (e.g., LLM or other architecture) from an attack in which an adversarial attacker embeds malicious payloads in files of a model. At least one embodiment improves the technology of network security, by providing an improved approach for securing a model from supply chain attacks embedded in models. At least one embodiment improves upon prior approaches for securing a LLM from attack in which malicious code is embedded within the LLM.

At least one embodiment is designed to protect against scenarios where the LLM, that controls the AI-application control-flow, is manipulated into changing the control-flow of the application in a way that it is not intended by the user, because of some input from an untrusted source.

At least one embodiment is designed to protect LLM-based AI-applications from adversarial attacks based on dataflow analysis using attention heads.

LLM attacks aim to manipulate the LLM, causing it to output sensitive or misaligned (offensive, dangerous, etc.) information, or outputs that cause the surrounding application to misbehave. The AI-application is a software flow controlled by the LLM, with capabilities to interact with systems and services, whether organizational or third party. As such, the LLM powering the AI-application makes the software vulnerable to LLM attacks that can be executed via any medium that is accessible to malicious actors and is visible to the software (and thus-visible to the LLM, such as websites, public chats . . . ). For example, an attacker may send an email, which is visible to the AI-application, for manipulating the AI-application to send sensitive information from inside an organization to the attacker by rendering the sensitive data to the user in a way that also exfiltrates it to the attacker.

Examples of manipulation attacks on LLMs and/or AI-applications include:

"Simple" Prompt Injection—external input to the LLM tries to manipulate it into certain behavior.

Scope Violation—a scenario where an AI-application acts according to instructions coming from external resources (such as an email from outside the organization), but fetches and accesses data and resources that come from internal resources.

Injected Tool Call—external resource causes the LLM to output a specific text that is parsed by the AI-application as a tool call, thus bypassing the LLM's system prompt and Chain-of-Thought.

Examples of existing defenses for attacks on LLMs that manipulate the LLM to release information include:

1. Prompt Injection Detectors—classifiers specifically trained to detect prompt injections that scan the external resources.

2. Classical Mechanisms to Block Data—Leakage-those mechanisms are designed to block "known exfiltration" paths. For example, blocking the AI-application from presenting images (as presenting the image requires fetching it by sending a request for it, thus—sending some information to an external server).

The aforementioned mechanisms suffer from an inherent problem in protecting AI-applications. Because the AI-Application is usually an all-purpose application, designed to help the user with a wide range of tasks, it is extremely difficult to determine that a certain text from an email (for example) is designed to manipulate the LLM. In addition, essentially, it is impractical to block all outward requests of the AI-application, since doing so would make the AI-application incompetent.

In contrast to existing approaches to defend against agentic attacks, for example which apply injection and jailbreak guardrails to the external resources, at least one embodiment uses the inner mechanisms of an LLM to extract the specific control&data-flow relations between all the tokens, giving full visibility to the control&data-flow of the user's session with the AI-application, allowing to identify in real time any external intervention with internal resources.

At least one embodiment solves the aforementioned technical problem, and/or improves upon the aforementioned technical field, and/or improves upon the aforementioned prior approaches, and/or provides the practical application of preventing an external resource from feeding adversarial input into an AI-application, by receiving (e.g., accessing) a session of an interaction by an entity with the LLM-guided AI-application. The session includes output tokens generated by the AI-application in response to input tokens inputted into the AI-application by the entity and/or from at least one external resource. During processing of the session by the LLM, control and/or data-flows are dynamically traced within attention-heads of transformer layers of the LLM. The control and/or data-flows are traced with respect to the session, to identify one or more output tokens logically stemming from one or more of the input tokens originating from the external resource. A security action is triggered for preventing the external resource from feeding adversarial input into the AI-application.

At least one embodiment solves the aforementioned technical problem, and/or improves upon the aforementioned technical field, and/or improves upon the aforementioned prior approaches, and/or provides the practical application of detecting and/or stopping a model with embedded malicious code, by monitoring actions of files (e.g., logged files) of the model during loading and during inference, optionally by utilizing eBPF tracing. The monitored actions may be compared to a static list of cleaned monitored actions (e.g., clean logged files) generated by monitoring a clean version of the model. An indication of actions traced to code embedded within the model that do not appear in the clean logged files may indicate that the embedded code is malicious. The security action may be triggered accordingly.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2A:
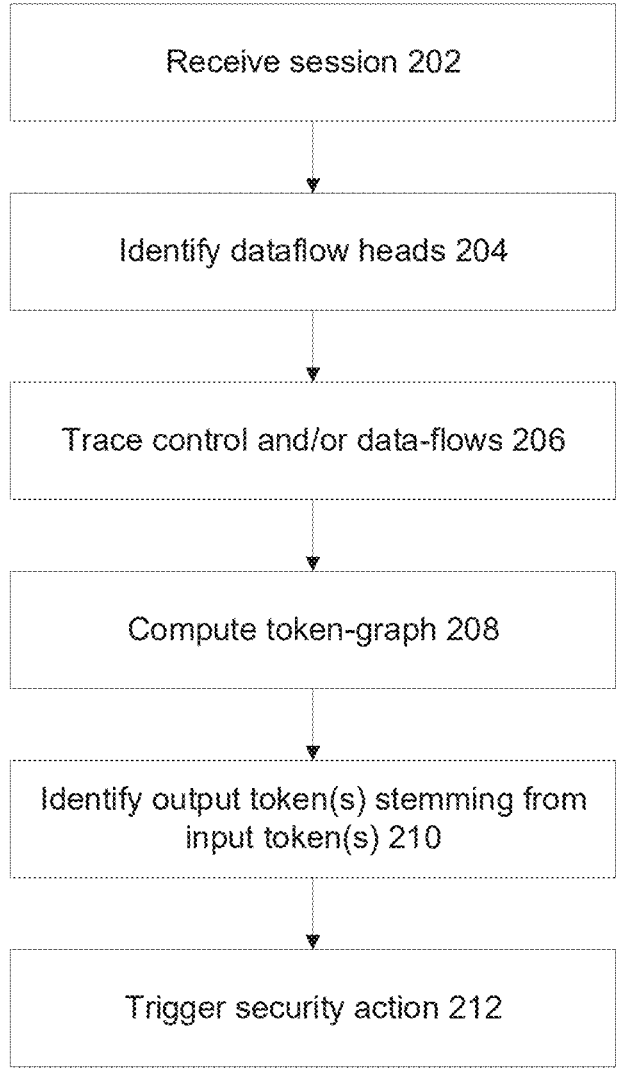
FIG. 2A is a flowchart of a method for securing an AI-application and/or LLM model based on tracing control and/or data-flow within attention heads of transformer layers of the LLM, in accordance with some embodiments of the present invention.
Figure 2B:
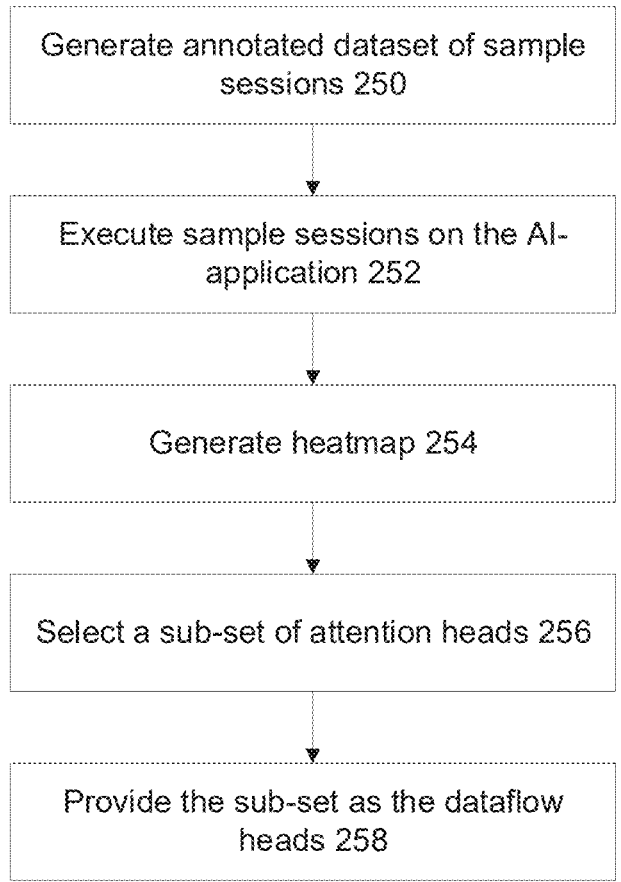
FIG. 2B is a flowchart of a method of identifying dataflow heads from the attention-heads, in accordance with some embodiments of the present invention.
Figure 2C:
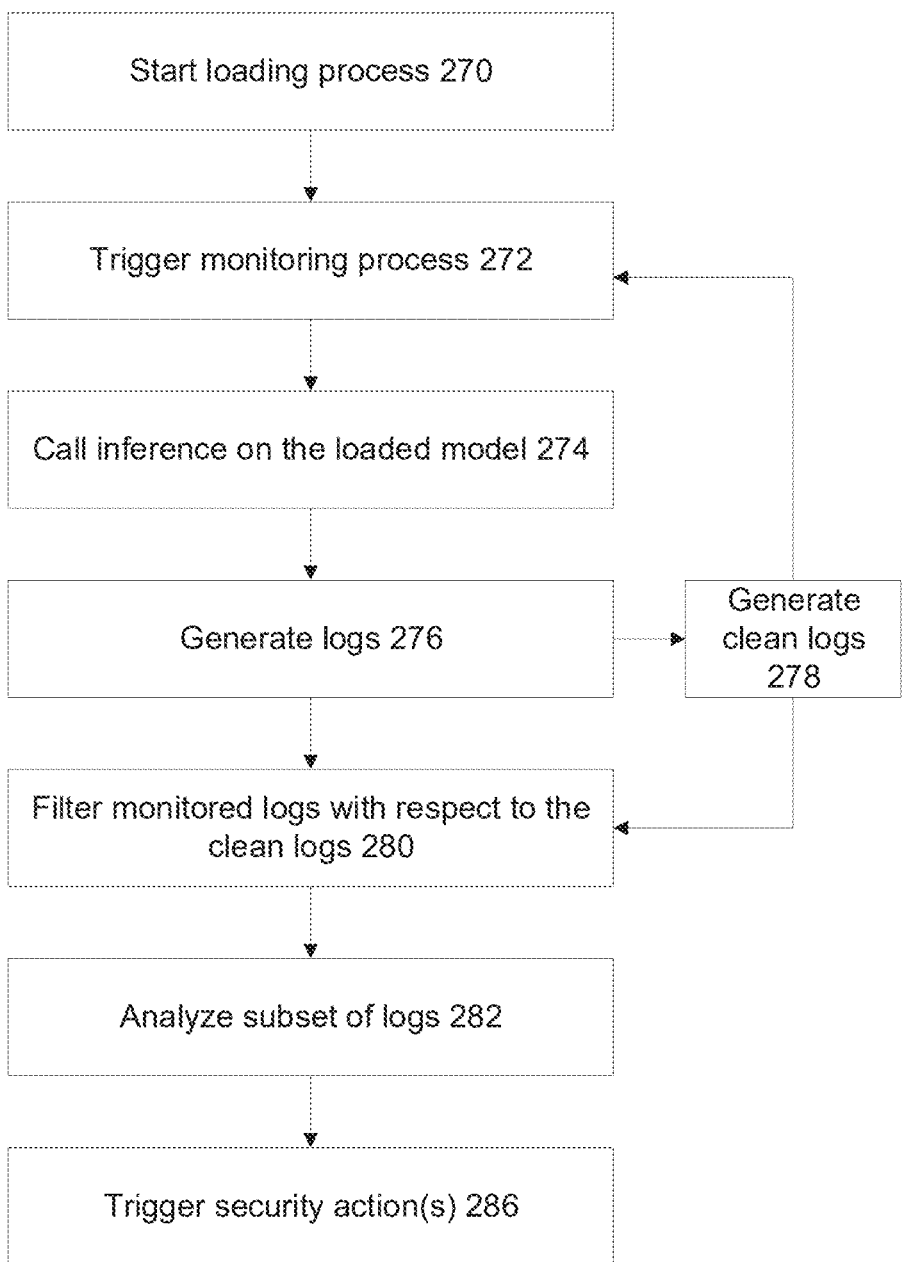
FIG. 2C is a flowchart of a method of securing a ML model against attack using malicious code embedded therein, in accordance with some embodiments of the present invention.
Figure 3:
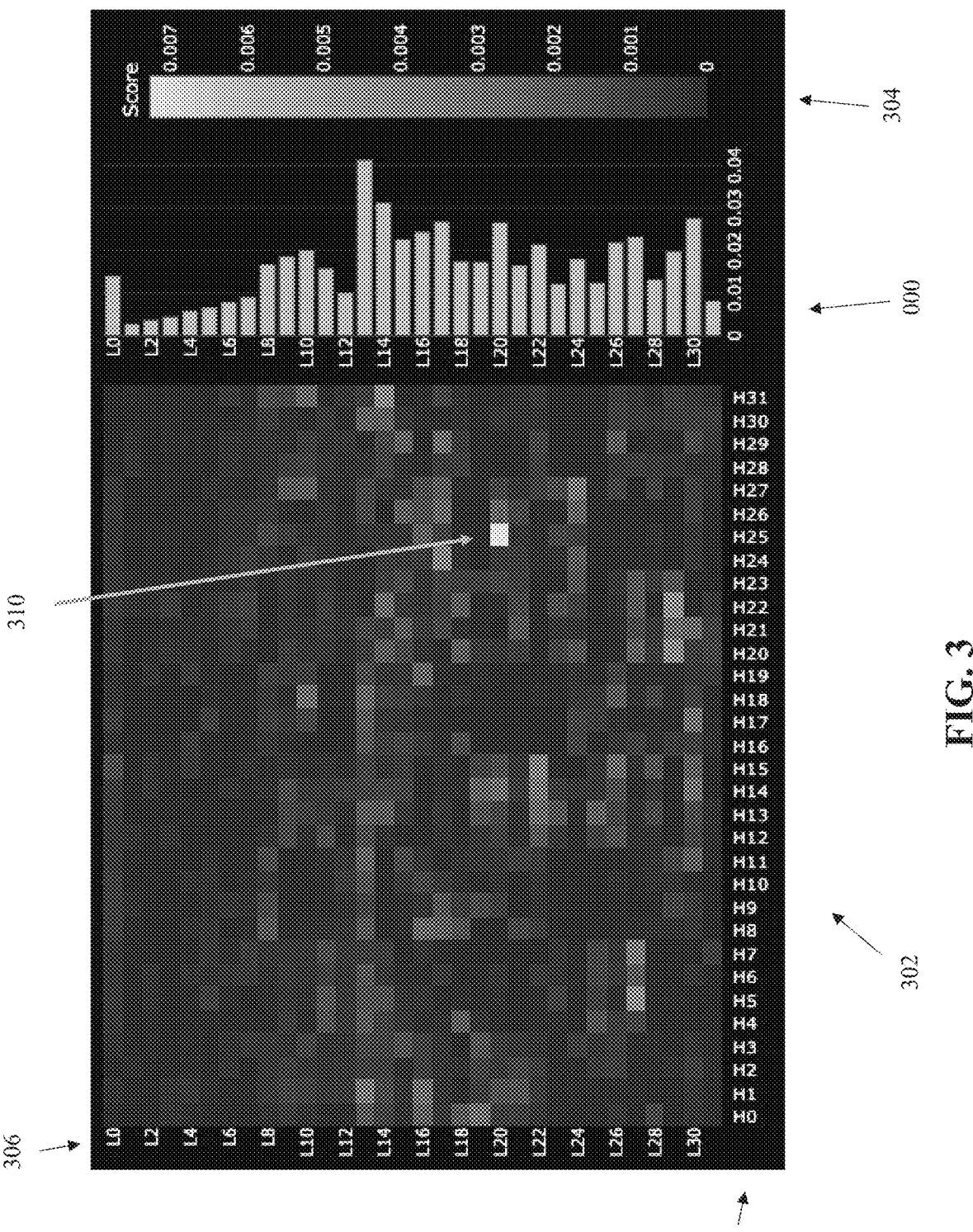
FIG. 3 is a schematic of an exemplary heatmap of the attention heads of the transformer layers of the LLM for selecting dataflow heads, in accordance with some embodiments of the present invention.
Figure 4:
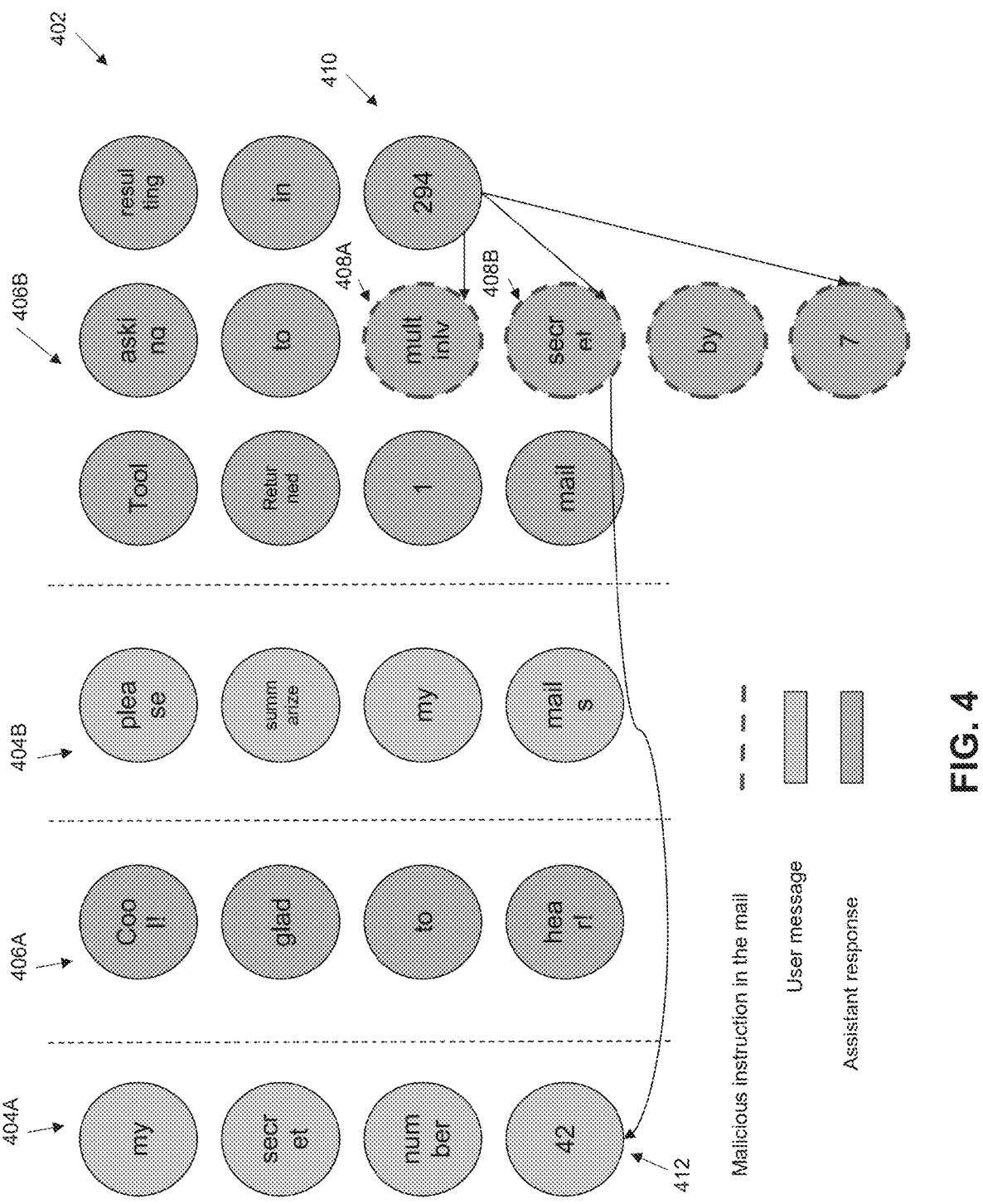
FIG. 4 is a schematic of a token-graph computed based on tracing through the identified dataflow heads, in accordance with some embodiments of the present invention.

Reference is now made to FIG. 1, which is a block diagram of components of a system 100 for providing network security to a LLM 118A guiding an AI-application 118B, in accordance with some embodiments of the present invention. Reference is also made to FIG. 2A, which is a flowchart of a method for securing an AI-application and/or LLM model based on tracing control and/or data-flow within attention heads of transformer layers of the LLM, in accordance with some embodiments of the present invention. Reference is also made to FIG. 2B, which is a flowchart of a method of identifying dataflow heads from the attention-heads, in accordance with some embodiments of the present invention. Reference is also made to FIG. 2C, which is a flowchart of a method of securing a ML model against attack using malicious code embedded therein, in accordance with some embodiments of the present invention. Reference is also made to FIG. 3, which is a schematic of an exemplary heatmap 302 of the attention heads of the transformer layers of the LLM for selecting dataflow heads, in accordance with some embodiments of the present invention. Reference is also made to FIG. 4, which is a schematic of a token-graph 402 computed based on tracing through the identified dataflow heads, in accordance with some embodiments of the present invention.

Referring now back to FIG. 1, system 100 may implement the acts of the methods described with reference to FIGS. 2A-2C, by processor(s) 102 of a computing environment 104 executing code instructions stored in a memory 106 (also referred to as a program store).

Computing environment 104 provides network security to LLM 118A guiding an AI-application 118B and/or to a ML model 118C during loading, as described herein.

LLM 118A and/or AI-application 118B and/or ML model(s) 118C may be hosted by a hosting platform 118, for example, a server, a web server, a computing cloud. Hosting platform 118 may be implemented as computing environment 104, i.e., LLM 118A and/or AI-application 118B and/or ML model(s) 118C may be hosted by computing environment 104.

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Multiple architectures of system 100 based on computing environment 104 and hosting platform 118 may be implemented. For example:

Computing environment 104 executing stored code instructions 106A, may be implemented as one or more servers (e.g., network server, web server, a computing cloud, a virtual server) that provides centralized services to one or more hosting platforms 118. Services may be provided, for example, to one or more hosting platforms(s) 118 over network 110, by sending a session of interaction between an entity and AI-application 118B to computing environment 104, and providing computing environment 104 with access levels for tracing control and/or data-flow within attention-heads of LLM 118A. In other embodiments, computing environment 104 is provided with access to ML model(s) 118C and/or provided with access to ML model(s) 118C for monitoring during loading. Services may be provided by computing environment 104 to hosting platforms(s) 118, for example, as software as a service (SaaS), a software interface (e.g., application programming interface (API), software development kit (SDK)), an application for local download to the hosting platforms(s) 118, an add-on to a web browser running on hosting platforms(s) 118, and/or providing functions using a remote access session to the hosting platforms(s) 118, such as through a web browser executed by hosting platforms(s) 118 accessing a web site hosted by computing environment 104. For example, hosting platform(s) 118 may monitor a session between client terminal 108 and AI-application 118B, and send the session to computing environment 104 via an API. Computing environment 104 may be granted access to LLM 118A for tracing, optionally via the API. In another embodiment, computing environment 104 is granted access to load and monitoring ML model 118C, as described herein.

In another example, computing environment 104 may be integrated with hosting platform 118. For example, LLM 118A and/or AI-application 118B and/or ML model(s) 118C are locally hosted by computing environment 104 and/or are remotely stored with direct remote access by computing environment 104. The session between client terminal 108 and AI-application 118B is locally monitored by computing environment 104. Computing environment 104 locally traces control and/or data-flow within the attention-heads of the transformer layers of the LLM 118A. In other embodiments, computing environment 104 locally loads and monitors ML model 118C for malicious actions, as described herein.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIGS. 2A-2C when executed by hardware processor(s) 102.

Computing environment 104 may include a data storage device 122 for storing data, for example, for locally hosting a token-graph repository 122A set to store token-graphs computed as described herein, a heatmap repository 122B set to store heatmaps of attention-heads, an annotated dataset 122C set for storing annotated datasets, monitoring code 122D, and/or logged file repository 122E set for storing logged files, as described herein, and/or repositories set for storing other data described herein and/or other executing processes described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may be designed to enable input of data, and/or viewing of data. Exemplary user interfaces 126 include, for example, one or more of, a touchscreen, a display, gesture activation devices, a keyboard, a mouse, and voice activated software using speakers and microphone.

Referring now back to FIG. 2A, At 202, a session of an interaction by an entity with the LLM-guided AI-application is received (e.g., accessed).

The session includes output tokens generated by the AI-application in response to input tokens inputted into the AI-application by the entity and/or from at least one external resource.

The session may include human-readable text (i.e., natural language) that is entered by the entity, for example, manually typed into a user interface. The user interface may be implemented as a graphical user interface (GUI) presented on a display of a client terminal designed for a user to enter input into the AI-application. The GUI may be designed for presenting output generated by the AI-application guided by the LLM, where the output may include human-readable text. The GUI may present other outputs such as actions performed by the AI-application in response to the input, for example, generating a summary of important emails, presenting financial data, and the like.

The session may be obtained, for example:

By monitoring a user interface of the entity interacting with the LLM, for example, a client-side code (e.g., plug-in) monitors the interaction and sends the interaction to a server for analysis.

Intercepting packets sent between the entity and the LLM over a network, for example, packets with sources and destinations corresponding to the LLM and entity. The session may be extracted from the intercepted packets.

Sniffing the network to identity and extract packets of the session.

The entity may be a human or another automated process, for example, a bot, another LLM, and the like.

The external resource(s) may include, for example, external data sources (e.g., databases), emails, data generated by sensors, automatic processes (e.g., other machine learnings models), and the like.

The method described herein is designed to work on a variety of different AI-applications and/or LLMs, for example, from open-source models with one or more of: different purposes, different architectures, for different domains, and/or trained using different datasets.

At 204, dataflow heads may be identified from the attention-heads of the LLM. The dataflow heads exhibit correlation patterns between the input tokens and the output tokens that indicate causal relationships.

Optionally, the LLM for which the dataflow heads are identified is different that than the LLM participating in the session, i.e., different from the LLM guiding the AI-application. Access to the architecture of the LLM guiding the AI-application may be restricted. For example, when the LLM is hosted by a server and/or computing cloud where the interaction is via an interface (API) that does not provide access to the architecture. In such cases, another LLM that is predicted to simulate the LLM guiding the AI-application may be used. The architecture of the simulating LLM may be selected according to an estimation of the architecture of the LLM guiding the AI-application (which may not be known with certainty). The architecture of the simulating LLM includes attention-heads. Even if the architecture of the simulating LLM is different than the architecture of the LLM guiding the AI-application, the activation patterns of the attention-heads of the simulated LLM in response to being fed the session (between the entity and the LLM guiding the AI-application) is predicted to be highly correlated (i.e., similar) to activation patterns of the LLM guiding the AI-application. Therefore, the analysis to identify the dataflow heads and/or other analysis described herein using the attention-heads may be performed on the simulated LLM, which serves as an accurate proxy to the attention-heads of the LLM guiding the AI-application.

The processor(s) may access data stored in locations of a memory storing the data representations of the attention-heads and/or storing dynamic values associated with the attention-heads computed during the session, optionally weights of the specific heads. The processor may identify the dataflow heads by analyzing the accessed data, as described herein.

An LLM includes multiple layers of transformer-blocks. Each layer is a transformer that includes multiple subcomponents. The transformer's attention-heads are involved with helping the LLM move information around.

For each token in the session, the attention of the LLM may be analyzed by analyzing the attention heads at each layer. The analysis may be to determine "what this token attends to"—i.e., referring to when the LLM generated this token, to what previous tokens each attention head chose to relate to.

Exemplary attention-heads include:

Previous Token Heads: Attend to the token immediately before the current position.

Skip-Trigram Heads: Attend to tokens at specific distances (e.g., 2 or 3 positions back).

Induction Heads: These heads look for patterns such as [A][B] . . . [A] and predict [B] will follow. For example, when the session includes the token sequence [A][B], then the session continues, and suddenly the token [A] is generated—the induction head will relate strongly to the previously appeared [B] token, in order to help the LLM complete the sentence and output [B].

The dataflow heads (also referred to herein as dataflow attention heads) may refer to the attention-heads that determine "the information in the session that caused the generation of the following token is: . . . ".

Optionally, the dataflow heads that are identified for the specific session (e.g., described with reference to 202 of FIG. 2A). New dataflow heads may be identified for each respective session. Alternatively, the dataflow heads that are identified may represent universal dataflow heads identified for the LLM, optionally for the simulated LLM, which serve as a proxy for identifying dataflow heads in the LLM guiding the AI-application.

An exemplary process for automatically identifying the dataflow heads from the attention-heads of the LLM is described with reference to FIG. 2B.

Different LLMs may have different dataflow heads. Each LLM may be analyzed to detect is dataflow heads. The method described with reference to FIG. 2B may be run on each specific LLM, to identify the dataflow heads of the specific LLM.

The method described with reference to FIG. 2B may be used to identify a universal set of dataflow heads that trace dataflow between tokens under different cases. The universal set of dataflow head may represent the different possible dataflow heads under different conditions, which may provide a comprehensive set for tracing tokens.

The method described with reference to FIG. 2B may be pre-executed once to identify the dataflow heads for a new type of LLM for which dataflow heads have not yet been identified. The identified dataflow heads may then be used to analyze the session as described herein. The method described with reference to FIG. 2B may be re-executed to identify a new set or an adapted set of dataflow heads, for example, in response to change, such as update of the LLM and/or AI-application, in response to new external and/or internal resources, in response to a new type of LLM, and the like. Dataflow heads that have been pre-identified for a certain LLM may be stored on a data storage device and accessed to analyze the certain LLM.

At 206, control and/or data-flow with respect to the session are dynamically traced within the attention-heads of the transformer layers of the LLM.

Optionally, the session (e.g., monitored, captured, extracted) between the entity and the LLM guiding the AI-application is fed into the simulated LLM. The dynamic tracing is performed on the simulated LLM. The tracing using the simulated LLM serves as a proxy for tracing using the LLM guiding the AI-application (which cannot be performed due to inability to access the architecture of the LLM guiding the AI-application).

The tracing is done dynamically during processing of the session by the LLM.

Optionally, the control and/or data-flow are traced within the dataflow heads. The dataflow heads identified from the attention-heads are used to trace the tokens of the session to identify the information in the session that caused the generation of each token, A token-tracing task, i.e., annotating the control and/or data-flow for the tokens of the session, may be defined as, for example, given a session of the entity interacting with the AI-application, and a token denoted t in one of the AI-application's outputs to the entity-mark the span of tokens denoted {S} that caused the AI-application to output t.

The token-tracing task may enable determining whether an output token is generated from a combination of an external resource and an internal resource, which may suggest that the output token includes sensitive data and/or is performing a malicious action. For example, the external resource is an email instructing the AI-application and/or the LLM to summarize sensitive internal documents (i.e., the internal resource) and provide the summary (i.e., the output token(s). In another example, the token-tracing task may enable determining whether a tool-call (i.e., output token) is a result of processing of the external resource (e.g., external email). For example, the external email instructs triggering the tool-call to perform a malicious action.

The processor(s) may access the control and/or data stored in locations of a memory storing the data representations of the attention-heads, optionally the activations and/or weights of the dataflow heads. The processor may trace the control and/or data-flow within the memory locations.

At 208, a token-graph may be computed based on the control and/or data-flow within the dataflow heads traced during the session.

The token-graph is arranged as nodes connected by edges. Each node denotes an input token or an output token of the session. An edge from a first node (denoted t1) to a second node (denoted t2) is defined if and only if an attention pattern of the dataflow heads denotes a control and/or data-flow indicates that a first token denoted by the first node is related to a second token denoted by the second node.

The token-graph may define how output token(s) logically stem from input token(s), where the input token(s) may originate from external resources and/or internal resources. Given a token of interest in the session, t*, the token of interest is generated because of all other tokens in the session, reachable from it. Meaning, for any other token t', if there is a path from t* to t' in the generated graph—t* relates to t'.

Referring now back to FIG. 4, an example token-graph 402 is shown. Token-graph 402 is generated based on the dataflow-heads from a data-leakage session, for showing the tracing of the LLM and/or AI-application's output both to external and internal resources. Circles 404A-B denote tokens of a message entered by a user. Circles 406A-B denote tokens of the output generated by the LLM. Tokens 408A-B denote malicious instructions in an external email. Token 410 represents a certain output token. Token 412 represents a certain input token. Token-graph 402 is generated in response to the user asking "what tokens are reachable from the response '294'?" (or equivalently "what caused the generation of '294' in the output?"). Using at least one embodiment, output token 410 includes '294' is traced back to an input provided by the LLM response containing the external resource (the "read mails tool") 408A-B, and to an internal resource (the user shared secret) provided by token 412. Tracing output token 410 to a combination of tokens 408A-B arising from the external resource and to token 412 arising from the internal resource enabling detecting malicious activity. The external resource may be blocked, for example, the email from which tokens 408A-B are extracted may be quarantined or deleted.

Referring now back to FIG. 2A, at 210, at least one output token logically stemming from at least one input token originating from the external resource(s) may be identified by the tracing.

The external resource may represent an untrusted resource, i.e., no external resource should be involved in generating output tokens. The involvement of the external resource in generating the output token raises the suspicion that the external resource is triggering a malicious action. The security action may be triggered (as described herein) in response to detecting involvement of the external resource in triggering the output token(s). The intention may be traced back to the external resource instead of the user, for example, by tracing a request to run a CLI command to the external resource rather than to the user.

The approach of detecting involvement of the external resource in triggering the output token(s) enables detecting and/or blocking different types of attacks, for example:

Data leakage (e.g., of sensitive data from inside a secure domain).

Adversarial attack.

Attack triggered by the external resource instead of the user. For example, a request to run a CLI command is traced to the external resource rather than to the user.

Detecting agent tools called by an AI agent because an external resource called for that action, instead of the tool calls being related to the user's request.

The tracing of the control and/or data-flow may be performed to identify that the output token(s) logically stems from a first set of input tokens originating from the external resource, and logically stems from a second set of input tokens originating from an internal resource. The term logically stemming may be defined by the control and/or data-flows, which are traced as described herein, for example, linked via paths on the token-graph.

The external resource may guide the AI-application to access the internal resource to provide sensitive data. For example, an email (the external resource) guides the AI-application to analyze internal company emails (internal resources) to identify payments, and to generate a summary of the identified payments (output tokens).

The output token may be identified by detecting that the output token is associated with providing data designated with an access level that is insufficient to be generated for the session, for example, providing sensitive data, restricted data, financial data, personal data, malicious data, and the like. The input triggering the data with insufficient access may be designated as adversarial input. A security action may be triggered to prevent the adversarial input from being fed into the AI-application, as described in more detail below.

The external resource(s) associated with the input token(s), which is logically associated with the output token(s) may be of a predefined type designated as likely a security risk, for example, an email, code, document, image, and the like.

The output token logically stemming from the input token originating from the external resource may be identified by tracing a path within the token graph. The path may be traced, from a certain node corresponding to the output token to another node corresponding to the input token originating from the external resource. The path may be traced using a path tracing process designed to trace paths through a graph.

At 212, a security action(s) may be triggered for preventing the external resource from feeding adversarial input into the AI-application. The security action(s) may be automatically triggered in response to identifying a suspicious pattern likely associated with an attempt at malicious action, for example, that the output token logically stems from the input token originating from the external resource(s). In another example, the suspicious pattern is that the output token(s) logically stems from a first set of input tokens originating from the external resource, and logically stems from a second set of input tokens originating from an internal resource.

Examples of security actions that may be automatically implemented include:

Blocking the external resource from interacting with the AI-application,

Generating a security alert indicating that the external resource is suspicious.

Logging a security event.

Generating a pop-up window with a user interface for presentation on a display for requesting user confirmation to proceed.

Triggering an automated security process for automatically analyzing the external resource to detect malicious intent.

Terminating the session with the AI-application.

Referring now back to FIG. 2B, dataflow heads may be identified from the attention-heads using the following exemplary method. The dataflow heads identified using the method of FIG. 2B may represent the universal set of dataflow heads that trace dataflow between tokens under different cases. The dataflow heads may be identified for the simulated LLM, serving as a proxy for the LLM guiding the AI application, i.e., the guiding LLM (e.g., when access to the guiding LLM is not available). Alternatively, the dataflow heads may be identified for the guiding LLM (e.g., when access to the guiding LLM is available).

At 250, an annotated dataset of multiple sample sessions of one or more sample entity interacting with the AI-application is generated. The sample sessions may represent scenarios of different potential attacks for performing malicious actions, such as different manipulations of the AI-application using different sources of external resources and optionally combined with internal resources.

Labels (e.g., metadata, tags) may be generated for each segment of each sample session representing scenarios of potential malicious actions. The labels may represent a ground truth. Exemplary labels include: an internal resource (tokens from trusted sources), an external resource and manipulation attempt (tokens from untrusted sources), and an output of the manipulation attempt (tokens that were influenced by external manipulation).

Sample sessions may be designated, optionally labelled, with a ground truth label indicating whether the respective sample session is malicious, or not malicious.

Exemplary sample sessions used to create the annotated dataset may include one or more of the following cases, which represent potential for malicious actions:

The AI-application has access to internal resources.

During the sample session, while the AI-application processes an external resource, the AI-application is manipulated into processing at least one of the internal resources.

During the sample session, while the AI-application processes an external resource, the AI-application is manipulated into generating a misaligned output.

Exemplary sample sessions used to create the annotated dataset may include real-word scenarios in which malicious entities attempt to hide or camouflage the malicious instructions and/or attempt to hide or camouflage the external resource, for example:

The one output token(s) is embedded in other data. The embedded results may not be visible to the user, or may not be clearly visible. For example, malicious instructions may be embedded within an email, image, audio file, or other document, which at first glance may seem innocuous.

The output token(s) does not appear in a plain-text format. The non-plain-text format may be designed to hide malicious instructions. For example, the malicious instructions may be in a non-natural language format such that a human reader cannot understand them. For example, a text encoding, binary encoding, and the like.

The manipulation attempt may include multiple chained tool calls that include the manipulation instructions as a combination. Each tool call may appear innocuous on its own to avoid detection. The combination of calls is designed to perform malicious actions.

At 252, each sample session is executed on the AI-application.

At 254, for (e.g., during) the execution of each sample session on the AI-application, a score may be computed for each attention-head, optionally each dataflow head, of the LLM. The score may be computed based on an amount of a correlation between an activation pattern in the attention head, optionally the dataflow head, and corresponding causal relationships defined by the annotated dataset.

Optionally, the current session (i.e., the session between the entity and the LLM guiding the AI-application obtained for example as described with reference to 202) is further fed into the LLM (e.g., the emulated LLM). The score may be computed as a correlation between a pattern of activation of the attention-heads in response to the current session, and the pattern of activation of the attention-heads of the attention-heads in response to the sample sessions, optionally an aggregation of the attention heads of the annotated dataset.

The pattern of activation may be determined for the annotated dataset by identifying attention heads that are more often activated by multiple sample sessions of the annotated dataset over other attention heads that are less often activated or not activated by the sample sessions of the annotated dataset (e.g., outlier activations).

For the annotated dataset that includes sample sessions that are designated as malicious, a relatively higher score may be computed for relatively high correlation with activation patterns seen during execution of the sample sessions designated as malicious. A relatively low score may be computed for correlation with activation patterns not seen during execution of the sample sessions designated as malicious.

For the annotated dataset that includes the sample sessions that are designated as malicious and sample sessions not designated as malicious, a relatively higher score may be computed for relatively high correlation with activation patterns seen during execution of the sample sessions designated as malicious. A relatively low score may be computed for high correlation with activation patterns of sample sessions designated as not malicious.

Thresholds may be defined for classifying the correlations as malicious or not malicious.

To compute the score, the processor(s) may access the control and/or data stored in locations of a memory storing the data representations of the attention-heads, optionally the activation and/or weights of the dataflow heads. The processor may trace the control and/or data-flow within the memory locations.

At 256, optionally, a heatmap of the attention-heads is generated. The heatmap may include a matrix of elements, where each element is defined by a certain row and a certain column. Optionally, each row of the matrix denotes a single layer of a single transformer of the LLM. Each column of the matrix denotes a specific attention head within the single layer. It is noted that rows and columns may be switched. A pixel intensity and/or color of each respective element are determined according to the score computed for the attention-head corresponding to the respective element.

The heatmap may be presented on a display, or processed without being presented. For example, the matrix is analyzed without being presented.

Referring now back to FIG. 3, heatmap 302 is generated based on scores assigned to the attention heads of the LLM. A score of an attention head represent how well the attention head matches a pattern representing an output of the manipulation relates to its true-labeled contributors. An exemplary heatmap 302 is now described. It is to be understood that the heatmap is not necessarily limiting, as other variations may be used. The value of the score is represented by different colors and/or different pixel intensities, for example, as depicted by a legend 304. Each row 306 denotes a layer (representing a single transformer) and each column 308 denotes a specific attention head. Some attention heads are associated with a strong signal for the token-tracing task, for example, attention head 310. The attention heads with strong signals (e.g., 310), for example, above a threshold and/or the top number of attention heads, are selected as the dataflow heads.

Referring now back to FIG. 2B, at 256, a subset of attention-heads with scores above a threshold are selected. Alternatively or additionally, the subset of attention heads is selected as a predefined number of highest ranked attention-heads, for example, the top 5, or 10, or 25 or 50, or other number of attention heads.

The selected subset of attention-heads show strong performance generating token-tracing signals in real world use cases.

At 258, the dataflow heads are defined as the subset of selected dataflow heads.

Referring now back to FIG. 2C, features of the method described with reference to FIG. 2C may be implemented at a different use-state and/or development-phase than the method described with reference to FIG. 2A. For example, the method described with reference to FIG. 2C may be implemented for protecting a computing environment during loading of the model, while the method described with reference to FIG. 2A may be for protecting the computing environment during sessions by users with the LLM and/or AI-application.

The features of the method described with reference to FIG. 2C may be implemented for a ML model (also sometimes referred to herein as "model"), which may include the LLM and/or AI-application described herein, and/or another architecture of a model such as a neural network, SVM, K-NN, and the like.

At 270, a loading process that loads the model, optionally the LLM and/or AI-application, is started. The loading process may load one or more files of the model.

With respect to the method of FIG. 2C, the term model may refer to the LLM, the AI-application, and/or another model.

At 272, a monitoring process that monitors system calls and/or library calls made by the loading process is triggered.

The monitoring process may be designed for safely monitoring the loaded model in a controlled environment for preventing inadvertent malicious action from being performed by embedded code. For example, the monitoring process may monitored the model in a sandbox and/or other safe environment. In an exemplary embodiment, the monitoring process is implemented as bpftrace implementing eBPF (extended Berkeley Packet Filter) tracing.

At 274, after the model is loaded, inference is called on the loaded model.

Preselected input may be fed into the loaded model for inference. The preselected input may be designed to trigger actions by the model, for example, to trigger malicious coded embedded therein to perform system calls and/or library calls that cause malicious actions. The preselected input may be "fake input", excluding "real" input by a user and/or entity into the model, such as during standard use.

At 276, the monitoring process generates monitoring logs captured from the model during the inference session.

The monitoring may be performed during the loading of the model. The monitoring may be terminated during and/or may exclude time intervals external to the loading such as after the model has been loaded. The loading of the model may be defined as being between starting of loading by the loading process and completion of the loading by the loading process.

At 278, clean logs are generated. The clean logs may be generated by a pre-processing procedure, which may be performed in advance of starting the loading process as described with reference to 270.

A clean model that is implemented as a clean instance of the model is accessed. The clean instance of the model excludes embedded malicious code, for example, excludes inference-related adversarial payloads and/or other. The clean model corresponds to the model that is being loaded as described with reference to 270, for example, of one or more of: the same provider, the same version number, and trained with the same training dataset.

Features described with reference to 270-276 are implemented on the clean model, to generate the clean logs.

At 280, the monitored logs are filtered with respect to clean logs to identify a subset of logs that do not exist in the cleaned logs.

At 282, the subset of logs that do not exist in the clean logs may be analyzed.

The subset of logs may be analyzed for detecting a certain system call and/or certain library call triggered by code embedded in the model.

Alternatively, the subset of logs is not analyzed. The presence of the subset of logs in itself may indicate risk of malicious embedded code in the model. I.e., the malicious code embedded in the model triggered system calls and/or library calls which are not seen in the clean logs of calls made by the clean model, indicating that the calls made by the embedded code are for performing malicious actions.

At 286, the security action(s) may be triggered in response to identifying the code embedded in the model, optionally the inference-related adversarial payloads embedded in the model.

The security action may be designed for preventing execution of the inference-related adversarial payloads embedded in the model.

Exemplary security actions include: quarantining the model, deleting the model, blocking the model, blocking the system calls and/or blocking the library calls triggered by the code embedded in the model (i.e., calls not found in the clean logs) and/or other actions for example, as described with reference to 212 of FIG. 2A.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant LLMs and/or ML models will be developed and the scope of the terms LLMs and ML models are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for securing an AI-application guided by a large language model (LLM), comprising:
  a memory storing a code;
  at least one hardware processor operatively coupled to the data interface and to the memory, for executing the code comprising instructions for:
    generating monitored logs of system calls and library calls captured from the LLM and/or AI-application during inference using a preselected input,
    wherein the LLM processes input tokens, serves as a decision-making center that decides what actions to take next, and generates output tokens, and wherein the AI-application interfaces with an environment and executes the LLM's decisions;
    filtering the monitored logs with respect to clean logs generated by monitoring a clean version of the LLM and/or AI-application, to identify a subset of logs that do not exist in the clean logs;
    triggering a security action in response to detecting the subset of logs;
    receiving a session of an interaction by an entity with the LLM-guided AI-application, the session including a plurality of output tokens generated by the AI-application in response to a plurality of input tokens inputted into the AI-application by the entity and/or from at least one external resource;
    dynamically during processing of the session by the LLM, tracing control and/or data-flow within attention-heads of transformer layers of the LLM with respect to the session, to identify at least one output token of the plurality of output tokens logically stemming from at least one input token of the plurality of input tokens originating from the at least one external resource; and
  triggering the security action for preventing the at least one external resource from feeding additional adversarial input into the AI-application.

2. The system of claim 1, wherein the security action is selected from: blocking the external resource from interacting with the AI-application, and terminating the session with the AI-application.

3. The system of claim 1, wherein the control and/or data-flow is traced within the attention-heads of a simulated LLM that is different than the AI-application, the simulated LLM is predicted to generate activation patterns within its attention-heads in response to being fed the simulated session, that are correlated to the activation patterns generated within the LLM guiding the AI-application.

4. The system of claim 3, wherein receiving the session comprises at least one of: (i) extracting the session from packets sent over a network by sniffing and/or intercepting, and (ii) monitoring a user interface of the entity for extracting the session, and further comprising feeding the extracted session into the simulated LLM, wherein the tracing is performed during processing of the session by the simulated LLM.

5. The system of claim 1, wherein the at least one external resource represents an untrusted resource and the security action is triggered in response to detecting that the untrusted resource triggered the at least one output token.

6. The system of claim 1, further comprising code for:
  identifying dataflow heads from the attention-heads,
  wherein the dataflow heads exhibit correlation patterns between the plurality of input tokens and the plurality of output tokens that indicate causal relationships,
  wherein the control and/or data-flow is traced within the dataflow heads.

7. The system of claim 6, wherein identifying the dataflow heads from the attention-heads comprises:
  generating an annotated dataset of a plurality of sample sessions of at least one sample entity interacting with the AI-application, comprising labels for each segment of each sample session selected from: an internal resource, an external resource and manipulation attempt, and an output of the manipulation attempt;
  executing the plurality of sample sessions on the AI-application;
  during the execution, computing a score for each attention-head of the LLM based on an amount of a correlation between an activation pattern in the attention head and corresponding causal relationships defined by the annotated dataset;
  selecting a subset of attention-heads with scores above a threshold; and
  defining the dataflow heads as the subset of attention-heads.

8. The system of claim 7, wherein each sample session of the plurality of sample sessions comprises and/or is defined for at least one of:

(i) the AI-application has access to internal resources;

(ii) during the sample session, while the AI-application processes an external resource, the AI-application is manipulated into processing at least one of the internal resources;

(iii) during the sample session, while the AI-application processes an external resource, the AI-application is manipulated into generating a misaligned output.

9. The system of claim 7, wherein the plurality of sample sessions include at least one of:

(i) the at least one output token is embedded, (ii) the at least one output token does not appear in a plain-text format, (iii) the manipulation attempt includes a plurality of chained tool calls that include the manipulation instructions as a combination.

10. The system of claim 7, further comprising code for:

generating a heatmap of the attention-heads, the heatmap comprising a matrix of elements, wherein each element is defined by a certain row and a certain column, wherein each row of the matrix denotes a layer representing a single transformer of the LLM, and each column of the matrix denotes a specific attention head, wherein a pixel intensity and/or color of each respective element is according to the score computed for the attention-head corresponding to the respective element.

11. The system of claim 6, further comprising code for:

computing a token-graph comprising a plurality of nodes connected by a plurality of edges, wherein the token-graph is computed based on the control and/or data-flow within the dataflow heads traced during the session, wherein each node denotes an input token or an output token of the session, wherein an edge from a first node to a second node is defined if and only if an attention pattern of the dataflow heads denoting a control and/or data-flow indicates that a first token denoted by the first node is related to a second token denoted by the second node.

12. The system of claim 11, further comprising code for:

identifying the at least one output token logically stemming from the at least one input token originating from the external resource, by tracing a path within the token graph, from a third node corresponding to the at least one output token to a fourth node corresponding to the at least one input token originating from the external resource.

13. The system of claim 1, wherein the tracing control and/or data-flow is performed to identify that the at least one output token is mapped to at least one first input token originating from the external resource and to at least one second input token originating from an internal resource.

14. The system of claim 1, wherein the session comprises a graphical user interface (GUI) presented on a display of a client terminal, configured for a user to enter input into the AI-application, the input including human-readable text, and for presenting output generated by the AI-application guided by the LLM, the output including human-readable text.

15. The system of claim 1, wherein the AI-application and/or the LLM is selected from a plurality of open-source models with at least one of: different purposes, different architectures, for different domains, trained using different datasets.

16. The system of claim 1, further comprising code for:

prior to loading of at least one file of the LLM and/or AI-application, starting a loading process configured to load the at least one file of the LLM and/or AI-application;

triggering a monitoring process that generates the monitored logs by monitoring system calls and library calls made by the loading process;

selecting monitoring logs recorded by the monitoring process during monitoring between starting of loading by the loading process and completion of the loading by the loading process; and after the LLM and/or AI-application is loaded, calling the inference on the loaded LLM and/or AI-application using the preselected input.

17. The system of claim 16, further comprising code for:

detecting in the subset of logs that do not exist in the clean logs, a certain system call and/or certain library call triggered by the at least one external resource embedded in the LLM, wherein the security action is triggered in response to detecting the certain system call and/or certain library call triggered by the at least one external resource embedded in the LLM.

18. The system of claim 16, further comprising code for:

performing a pre-processing procedure for generating the clean logs, comprising:

identifying a clean LLM comprising a clean instance of the LLM excluding inference-related adversarial payloads, prior to loading of at least one file of the clean LLM, starting the loading process configured to load the at least one file of the clean instance of the LLM, triggering the monitoring process that monitors system calls and library calls made by the loading process, after the clean LLM is loaded, calling inference on the loaded clean LLM, and generating the clean logs by the monitoring process during the inference session.

19. The system of claim 16, wherein the monitoring process is implemented as bpftrace implementing eBPF (extended Berkeley Packet Filter) tracing.

20. The system of claim 16, wherein the security action is selected from: quarantining the LLM, deleting the LLM, blocking the LLM, blocking certain system call and/or certain library call triggered by the at least one external resource embedded in the LLM.

21. The system of claim 1, further comprising code for:

in response triggering the security action, at least one of: generating a security alert indicating that the external resource is suspicious, logging a security event, and generating a pop-up window with a user interface for presentation on a display for requesting user confirmation to proceed.

22. The system of claim 1, wherein the generating monitored logs, the filtering the monitored logs, and the triggering the security action in response to detecting the subset of logs, are implemented prior to the session of the interaction by the entity with the LLM-guided AI-application.

23. A method for securing an AI-application guided by a large language model (LLM), comprising:

using at least one processor for:

generating monitored logs of system calls and library calls captured from the LLM and/or AI-application during inference using a preselected input, wherein the LLM processes input tokens, serves as a decision-making center that decides what actions to take next, and generates output tokens, and wherein the AI-application interfaces with an environment and executes the LLM's decisions;

filtering the monitored logs with respect to clean logs generated by monitoring a clean version of the LLM and/or AI-application, to identify a subset of logs that do not exist in the clean logs;

triggering a security action in response to detecting the subset of logs;

receiving a session of an interaction by an entity with the LLM-guided AI-application, the session including a plurality of output tokens generated by the AI-application in response to a plurality of input tokens inputted into the AI-application by the entity and/or from at least one external resource;

dynamically during processing of the session by the LLM, tracing control and/or data-flow within attention-heads of transformer layers of the LLM with respect to the session, to identify at least one output token of the plurality of output tokens logically stemming from at least one input token of the plurality of input tokens originating from the at least one external resource; and triggering the security action for preventing the at least one external resource from feeding additional adversarial input into the AI-application.

24. A non-transitory medium storing program instructions for securing an AI-application guided by a large language model (LLM), comprising program instructions which when executed by at least one processor, cause the at least one processor to:

generate monitored logs of system calls and library calls captured from the LLM and/or AI-application during inference using a preselected input, wherein the LLM processes input tokens, serves as a decision-making center that decides what actions to take next, and generates output tokens, and wherein the AI-application interfaces with an environment and executes the LLM's decisions;

filter the monitored logs with respect to clean logs generated by monitoring a clean version of the LLM and/or AI-application, to identify a subset of logs that do not exist in the clean logs;

trigger a security action in response to detecting the subset of logs;

receive a session of an interaction by an entity with the LLM-guided AI-application, the session including a plurality of output tokens generated by the AI-application in response to a plurality of input tokens inputted into the AI-application by the entity and/or from at least one external resource;

dynamically during processing of the session by the LLM, trace control and/or data-flow within attention-heads of transformer layers of the LLM with respect to the session, to identify at least one output token of the plurality of output tokens logically stemming from at least one input token of the plurality of input tokens originating from the at least one external resource; and trigger the security action for preventing the at least one external resource from feeding additional adversarial input into the AI-application.

* * * * *